No. 716,907. Patented Dec. 30, 1902.
J. P. LEGRAND.
RESILIENT TIRE FOR WHEELS.
(Application filed Mar. 26, 1901.)
(No Model.)
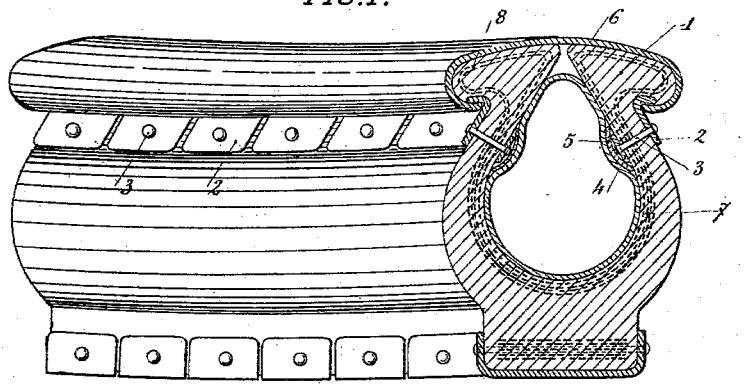
FIG. 1.
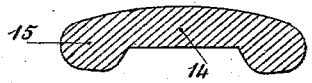
FIG. 2. FIG. 4. FIG. 3.
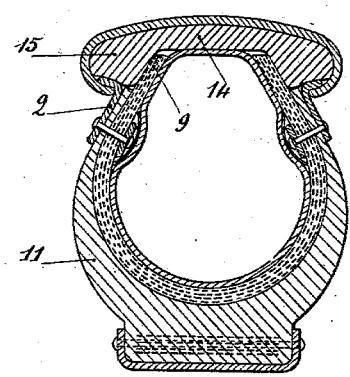
FIG. 5.
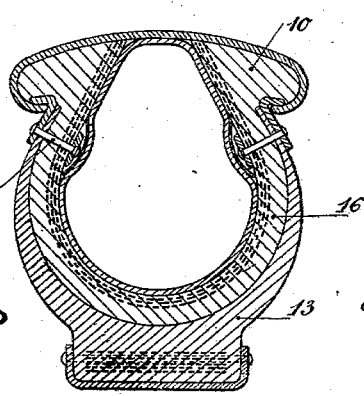
Witnesses
Anna P. McCole.
W. J. Barker
Inventor
J. P. LEGRAND
By E. P. Thompson
Atty

UNITED STATES PATENT OFFICE.

JEAN PAUL LEGRAND, OF LEVALLOIS-PERRET, FRANCE.

RESILIENT TIRE FOR WHEELS.

SPECIFICATION forming part of Letters Patent No. 716,907, dated December 30, 1902.

Application filed March 26, 1901. Serial No. 52,932. (No model.)

*To all whom it may concern:*

Be it known that I, JEAN PAUL LEGRAND, manufacturer, a citizen of the Republic of France, residing at Rue Danton, Levallois-Perret, Seine, in the Republic of France, have invented certain new and useful Improvements in Resilient Tires for Wheels, (patented in France, No. 303,466, September 3, 1900; in England, No. 4,238, February 27, 1901; in Belgium February 27, 1901; in Switzerland February 26, 1901; in Germany September 21, 1900; in Spain March 2, 1901, and in Italy March 1, 1901,) of which the following is a specification.

This invention relates to improvements in that class of resilient tires in which the cover of the air-chamber is fixed under the bent-over edges of the rim by means of shoulders or thickened edges, (heel-pieces.)

It has for its object to provide the cover of the tire with metallic hooks, which engage under the bent-over edges of the rim. These hooks have the advantage of strengthening and protecting the thickened edges or shoulders, which are liable to be cut or torn by the transverse strains, which tend to drag the thickened ends from under the bent-over edges of the rim, particularly during side-slipping. They have also the advantage of enabling a more simple arrangement of the canvas covers to be employed than has hitherto been the case. Finally these hooks serve also to fix the protective strips or caps more solidly on the tire when it is found desirable to provide the pneumatic tires with such protectors.

The invention will now be described more particularly with reference to the accompanying drawings, in which—

Figure 1 is a view in perspective and partially in section of a pneumatic tire provided with hooks in accordance with my invention. Fig. 2 is a transverse section showing the hooks adapted to a cover, having an improved arrangement of canvas with shoulders of pure rubber. Fig. 3 is a transverse section showing the cover without thickened edges, but provided with hooks, and a band provided with independent thickened edges or shoulders engaged in the rim. Fig. 4 is a section showing separately the band provided with independent thickened edges, and Fig. 5 is a transverse section showing a cover provided with hooks and a protector fixed by the same rivets on the cover.

Fig. 1 shows how I apply the hooks of my invention to a tire having a protective belt furnished with metallic strips, such as form the object of my United States Patent No. 661,915. In any case I take this kind of tire solely as an example, seeing that the metallic hooks may be applied to any kind of similar tires. It will be seen from Fig. 1 that the thickened edges 1 are protected against the dragging action by means of hooks 2, one of the sides of which engages under the bent-over edges of the rim 6 and the other side is fixed to the cover 7 of the tire by means of rivets 3. A washer 4 is interposed between the head of the rivet and the cover, and a canvas backing or strip 5 covers the heads of the rivets 3 in order that they will not deteriorate the air-tube. The hooks 2 are formed of narrow metal strips, (of about one and one-half centimeters,) and they are separated one from the other by about two millimeters. In this manner they leave the tire all its flexibility and cause no difficulty in mounting the tire on the rim. The adaptation of the metallic hooks 2 enables the arrangement of the canvas covers to be also simplified, which in the tires at present made have to be turned over so as to protect or cover the interior of the thickened ends, as is shown at 8, Fig. 1; but when the tire is hooked or engaged by means of bent strips 2 the strain endured by the thickened ends is much diminished and even almost destroyed, and this enables the straight canvases to be stopped at 9, as is shown in Fig. 2, and the thickened ends 10 to be formed by rolls or pads of pure rubber without interpolating canvas therein. This allows of a great simplification in the manufacture of the cover, because people in the trade know that the winding or wrapping of the canvases in the thickened ends in the manner shown at 8, Fig. 1, introduces somewhat considerable complications in the manufacture of covers. Finally the hooks also permit of thickened ends or heel-pieces fixed to the covers being entirely dispensed with. For this object I adopt the arrangement indicated in Figs. 3 and 4. It will be seen therefrom that the cover 11 is reduced to a simple strap or band and that it no longer has thickened ends—that is to say, the canvas is terminated in a straight line, as shown in Fig. 2, but that the rubber pads or shoulders 10 shown in this figure are dispensed with. It is evident that this introduces a great simplicity in the construction of the cover. In order to protect the air-tube and maintain the hooks 2 engaged under the bent-over edges of the rim, I arrange in the interior of the latter a circular elastic band 14, having the form shown separately in Fig. 4. This band has its ends 15 thickened so as to fulfil the office of independent shoulders or pads and to maintain the hooks constantly pressed under the edges of the rim when the air-chamber is partially deflated. Finally the rivets which serve for fixing the hooks on the cover may also serve for fixing on the cover crescent-shaped pieces or strips employed when the tires are intended to be provided with such pieces. The arrangement adopted is the one indicated in Fig. 5, in which 13 is the strip, which is firmly connected with the cover 16 and the hooks 2 by means of rivets 3. In this way a strip or cap very solidly fixed to the tire is obtained and there is no reason to fear its becoming detached. It will be noticed that my system of hooks is also applicable not only for imparting more solidity to new tires and allowing of the simplifications, changes, and ameliorations hereinbefore described, but also that this arrangement of hooks may serve for repairing old tires which have become useless owing to the thickened ends being cut, or even for fixing to tires already in existence strips or caps fitted with the band or belt having the metallic strips which form the object of my United States Patent No. 661,915, or not provided with such belts.

I declare that what I claim is—

1. In a wheel, the combination of a rim having bent-over edges, a cover having enlarged and thickened edges which fill said rim under its bent-over edges, and a series of hooks spaced from each other and fixed to said cover at the outside of said rim, and extending within said rim, and forming bearing-surfaces for said rubber cover against the edges of said rim.

2. In a wheel, the combination of a rim having a bent-over edge, an inflatable air-tube, a rubber cover therefor, of a given thickness, outside of said rim, and having edges of much greater thickness, which lie within the rim under the bent-over edges thereof, metallic hooks attached to said cover and lying between said thickened edges of the cover and the edge of said rim and bearing against said rim and a canvas for the cover without bent-over edges and terminating at the central portion of said rim and substantially parallel with the surface of said tube.

3. In a wheel, the combination of a rim having a bent-over edge, an inflatable air-tube, a rubber cover therefor of a given thickness, outside of said rim, and having edges of much greater thickness, which lie within the rim under the bent-over edges thereof, metallic hooks attached to said cover and lying between said thickened edges of the cover and the edge of said rim and bearing against said rim, and a canvas for the cover without bent-over edge and terminating at the central portion of said rim and substantially parallel with the surface of said tube, a cap 13 over the cover, and rivets passing through said cover, said cap and said hooks and holding them fixed to one another.

4. In a resilient tire for wheels, the combination of a rim having bent-over edges, a cover provided with thickened edges, and narrow metallic hooks placed at short distances apart beneath the thickened edges and fixed by rivets on the cover, said hooks being adapted to support the tearing or dragging strains in place of the thickened edges of the cover.

In witness whereof I have hereunto signed my name, this 13th day of March, 1901, in the presence of two subscribing witnesses.

JEAN PAUL LEGRAND.

Witnesses:
 NARCISSE CHËNEAU,
 VICTOR DE MARENDOWSKI.